(12) United States Patent
Suciu et al.

(10) Patent No.: US 9,109,462 B2
(45) Date of Patent: Aug. 18, 2015

(54) ENERGY-ABSORBING FAN CASE FOR A GAS TURBINE ENGINE

(75) Inventors: Gabriel L. Suciu, Glastonbury, CT (US); Allan R. Penda, Amston, CT (US); Christopher M. Dye, San Diego, CA (US); Jason Elliott, Huntington, IN (US)

(73) Assignee: United Technologies Corporation, Hartford, CT (US)

( * ) Notice: Subject to any disclaimer, the term of this patent is extended or adjusted under 35 U.S.C. 154(b) by 775 days.

(21) Appl. No.: 13/327,730

(22) Filed: Dec. 15, 2011

(65) Prior Publication Data

US 2013/0156542 A1 Jun. 20, 2013

(51) Int. Cl.
*F02K 1/70* (2006.01)
*F01D 21/04* (2006.01)

(52) U.S. Cl.
CPC ............... *F01D 21/045* (2013.01); *F02K 1/70* (2013.01); *Y02T 50/671* (2013.01)

(58) Field of Classification Search
CPC ................................ F01D 21/045; F02K 1/70
USPC ............. 415/9, 119, 121.2, 144, 156, 208.1, 415/208.2, 211.2, 220, 226, 227; 60/226.2
See application file for complete search history.

(56) References Cited

U.S. PATENT DOCUMENTS

| 4,197,052 | A | * | 4/1980 | Lardellier | 415/220 |
| 4,732,535 | A | * | 3/1988 | Tubbs | 415/144 |
| 4,778,110 | A | * | 10/1988 | Sankey et al. | 239/265.29 |
| 4,801,070 | A | * | 1/1989 | Hom et al. | 228/184 |
| 5,315,821 | A | * | 5/1994 | Dunbar et al. | 60/226.1 |
| 5,433,674 | A | * | 7/1995 | Sheridan et al. | 475/346 |
| 5,507,143 | A | * | 4/1996 | Luttgeharm et al. | 60/226.2 |
| 6,053,696 | A | * | 4/2000 | Roberts | 415/9 |
| 7,025,560 | B2 | * | 4/2006 | Clark | 415/9 |
| 7,255,528 | B2 | * | 8/2007 | Stretton | 415/9 |
| 7,513,734 | B2 | | 4/2009 | McMillan | |
| 2005/0102996 | A1 | * | 5/2005 | Lair | 60/226.2 |
| 2009/0193789 | A1 | * | 8/2009 | Pero | 60/226.2 |
| 2010/0040466 | A1 | * | 2/2010 | Vauchel et al. | 415/213.1 |
| 2010/0107599 | A1 | * | 5/2010 | Vauchel | 60/226.2 |
| 2011/0076132 | A1 | * | 3/2011 | Bottome | 415/9 |
| 2013/0025260 | A1 | * | 1/2013 | Pitiot et al. | 60/226.2 |
| 2013/0067885 | A1 | * | 3/2013 | Suciu et al. | 60/226.2 |

FOREIGN PATENT DOCUMENTS

GB 1245415 9/1971

* cited by examiner

*Primary Examiner* — Dwayne J White
*Assistant Examiner* — William Grigos
(74) *Attorney, Agent, or Firm* — Carlson, Gaskey & Olds, P.C.

(57) ABSTRACT

A fan case of a gas turbine engine includes a fan blade containment section defined about an engine axis and a plurality of helical ribs adjacent to the fan blade containment section.

20 Claims, 5 Drawing Sheets

ENERGY-ABSORBING FAN CASE FOR A GAS TURBINE ENGINE

BACKGROUND

The present disclosure relates to gas turbine engines, and in particular, to a fan case for a gas turbine engine.

The fan section of a gas turbine engine includes an array of fan blades which project radially from a hub within a fan case. Although exceedingly unlikely, it is possible for a fan blade or a fragment thereof to separate from the hub and strike the fan case. The fan case operates to prevent any liberated material from radially exiting the engine. The demands of blade containment are balanced by the demands for low weight and high strength.

For relatively small diameter engines, adequate containment capability is typically achieved with a hardwall design in which a metallic case thick enough to resist penetration by a blade fragment is utilized.

For relatively large diameter engines, a metallic fan case thick enough to resist penetration is prohibitively heavy so a softwall design is typically utilized in which a lightweight, high strength ballistic fabric is wrapped in a plurality of layers around a relatively thin, penetration susceptible metallic or composite case. In operation, a separated blade fragment penetrates the case and strikes the fabric. The case is punctured locally but retains structural integrity after impact. The punctured case continues to support the fabric and maintains clearance for the blade tips.

SUMMARY

A fan case of a gas turbine engine according to an exemplary aspect of the present disclosure includes a fan blade containment section defined about an engine axis and a plurality of helical ribs adjacent to the fan blade containment section.

A method of absorbing energy in a fan case of gas turbine engine during a fan blade impact event according to an exemplary aspect of the present disclosure includes axially deflecting the fan case in response to the fan blade impact event.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
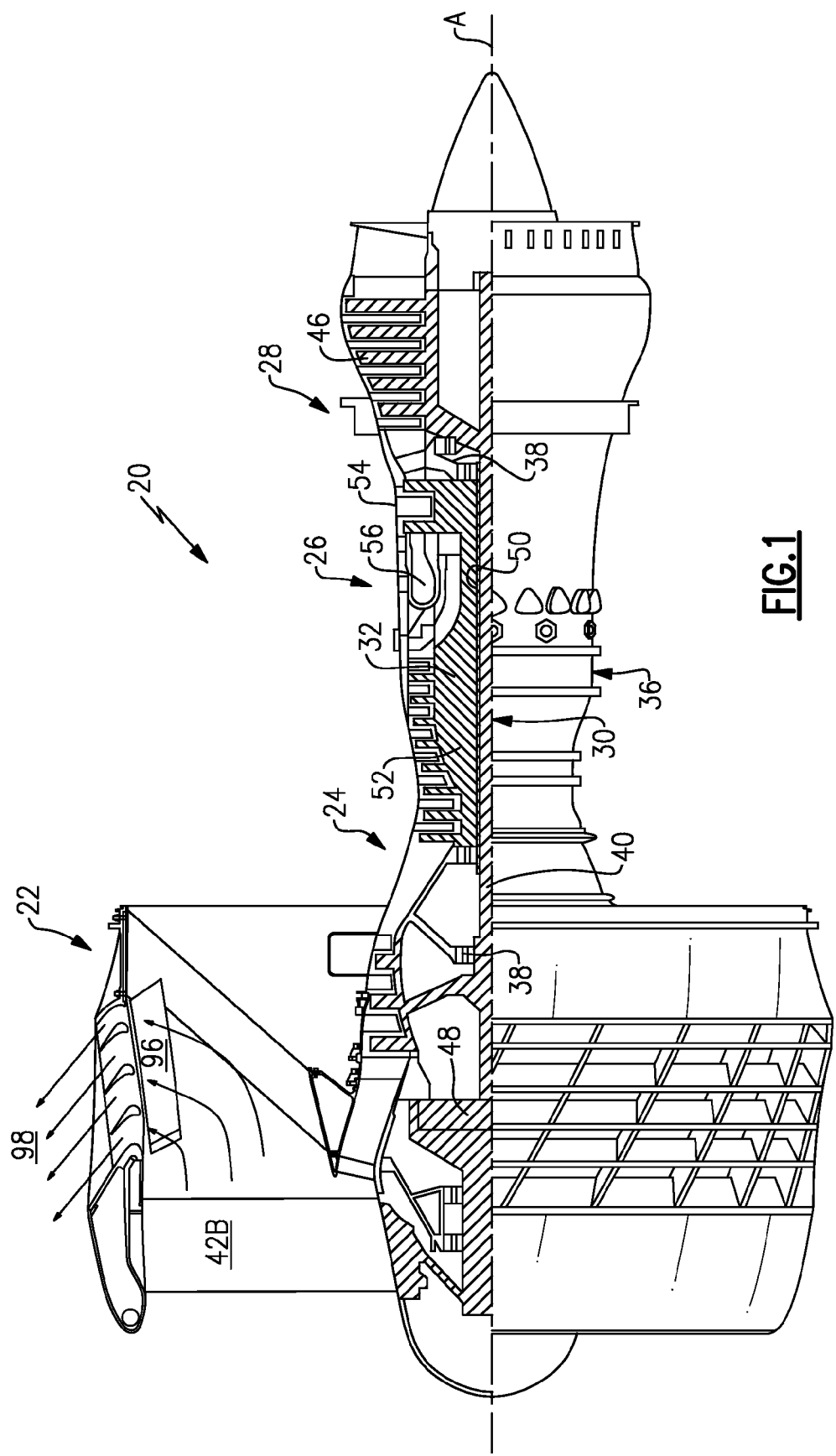
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) or a three spool architecture among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low spool 30 and a high spool 32 mounted for rotation about an engine central longitudinal axis A relative to an engine static structure 36 via several bearing systems 38. It should be understood that various bearing systems 38 at various locations may alternatively or additionally be provided.

The low spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low spool 30. The high spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low speed spool 30 and high speed spool 32 in response to the expansion.

Figure 2:
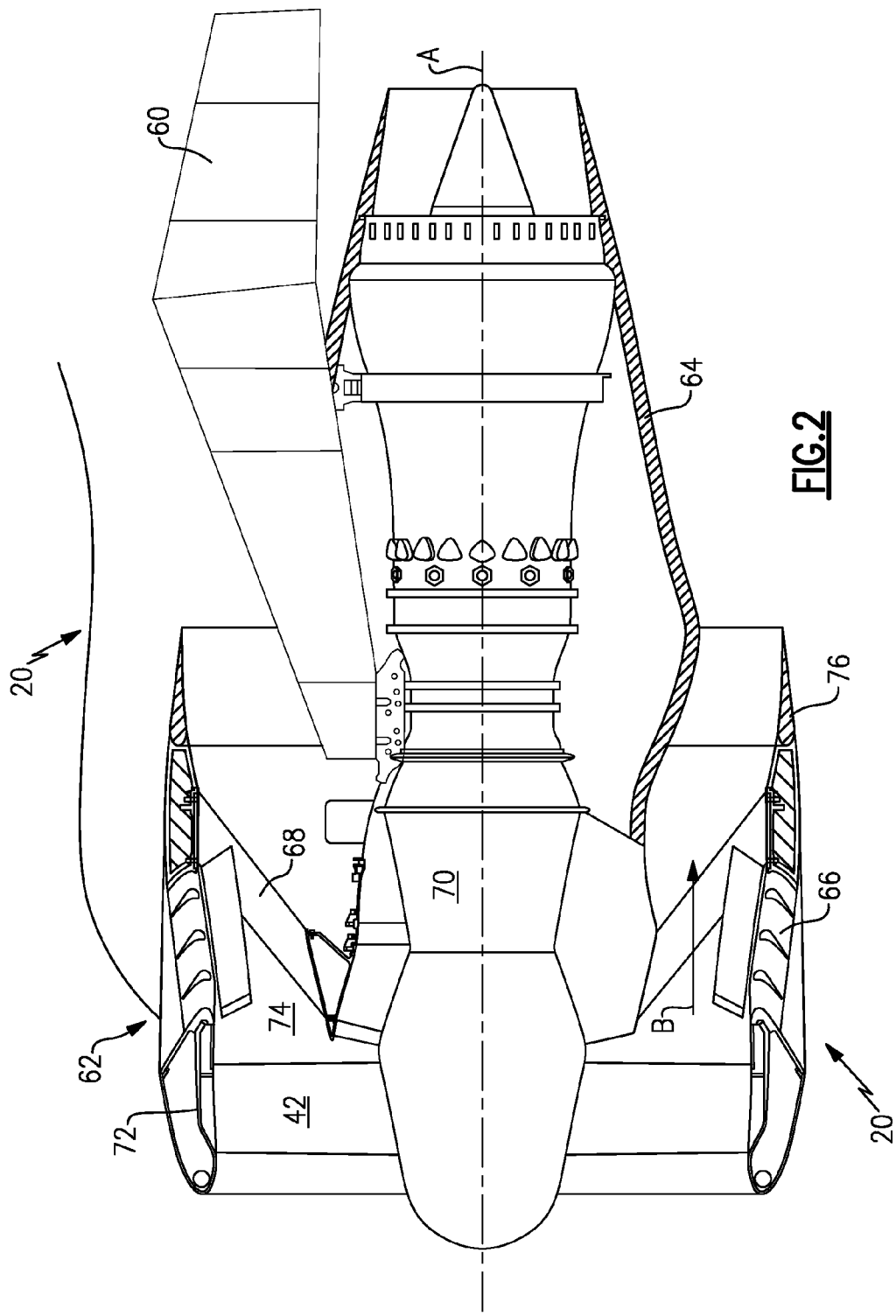
FIG. 2 is a schematic cross-sectional view of the gas turbine engine within a nacelle assembly.

With reference to FIG. 2, the gas turbine engine 20 is mounted to an engine pylon structure 60 within an engine nacelle assembly 62 as is typical of an aircraft designed for subsonic operation. The nacelle assembly 62 generally includes a core nacelle 64 and a fan nacelle 66. The fan nacelle 66 is supported relative to the core nacelle 64 by Fan Exit Guide Vanes (FEGVs) 68 which extend between a core case 70 and a fan case 72. The core case 70 and the fan case 72 are structural members which support the respective fan nacelle 66 and core nacelle 64 which define outer aerodynamic surfaces. The core case 70 is often referred to as the engine backbone and supports the rotational componentry therein. It should be understood that although a particular component arrangement is disclosed in the illustrated embodiment, various pylon structures and nacelle assemblies will benefit herefrom.

An annular bypass flow path 74 is defined between the fan nacelle 66 and the core nacelle 64. The engine 20 generates a high bypass flow arrangement with a bypass ratio in which approximately eighty percent of the airflow which enters the fan nacelle 66 becomes bypass flow. In the disclosed non-limiting embodiment, the bypass flow B communicates through the generally annular bypass flow path 74 and is discharged from the engine 10 through a variable area fan nozzle (VAFN) 76 which defines a variable exit area for the bypass flow.

As the fan blades within the fan section 22 are efficiently designed at a particular fixed stagger angle for an efficient cruise condition, the VAFN 76 is operated to effectively vary the fan nozzle exit area to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

Figure 3:
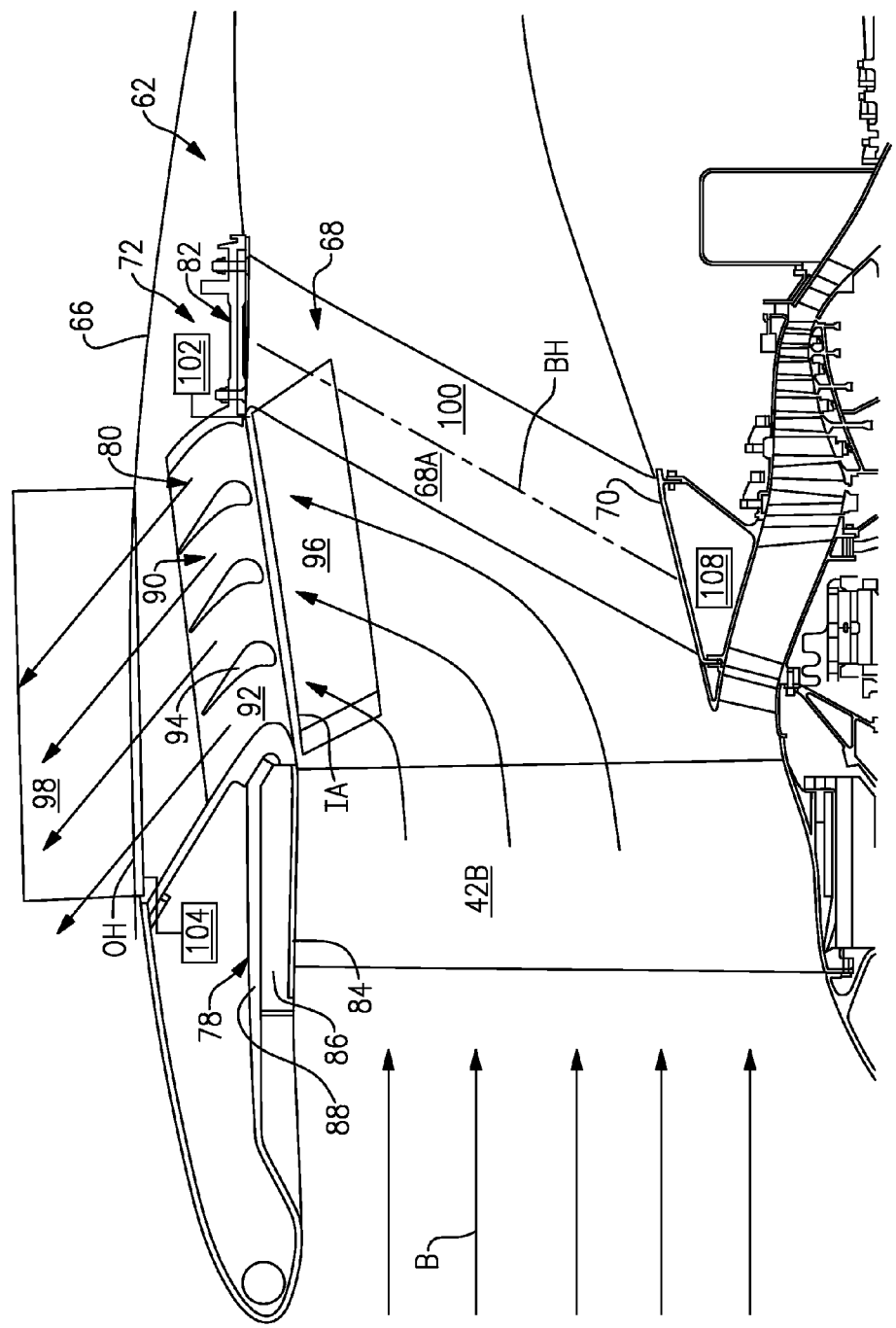
FIG. 3 is an enlarged schematic cross-sectional view of the gas turbine engine illustrating a thrust reverser integral with a fan case.

With reference to FIG. 3, the fan case 72 generally includes a fan blade containment section 78, a thrust reverser section 80 and a FEGV attachment section 82. That is, the fan case 72 may be formed of a multiple of sections formed of carbon fiber, metal alloys, or combinations thereof, which are bolted or otherwise assembled together. Alternatively, the sections may be manufactured as a unitary structure.

The fan blade containment section 78 generally includes an inner layer 84, a ballistic liner 86, and an outer structure 88. It should be appreciated that various other layers constructions and materials may alternatively or additionally utilized.

The inner layer 84 may include an abradable layer that provides close tolerances with the fan blades 42B and a honeycomb structure that provides acoustic dampening as well as the potential for retention of smaller blade fragments.

The ballistic liner 86 resists and dulls the ballistic event of fan blade liberation. The ballistic liner 86 may be a cylindrical belt of a rigid material such as a resin impregnated KEVLAR® material such as KEVLAR® XP™ for Hard Armor (KEVLAR is a registered trademark of E.I. DuPont de Nemours & Company), LEXAN® (LEXAN is a registered trademark of SABIC Innovative Plastics), metallic structures, or ceramic materials.

The ballistic liner 86 resists and dulls the ballistic threat which may be particularly acute when metallic fan blades 42B are utilized. The ballistic liner 86 need only extend a relatively short axial length as the hard ballistic liner 66 is radially located directly outboard of the fan blades 42B.

The outer structure 88 facilitates support of the fan nacelle 66 as well as provide for attachment to the thrust reverser section 80 and the FEGV attachment section 82. It should be understood that various assemblies may alternatively or additionally provided with the thrust reverser section 80 upstream of the FEGV attachment section 82.

The thrust reverser section 80 is a structural component which forms an integral portion of the fan case 72. The thrust reverser section 80 includes a thrust reverser cascade 90 with a plurality of helical ribs 92 and a multiple of cascade airfoils 94. The plurality of helical ribs 92 are structural components which form an integral portion of the fan case 72 in a direction equivalent or opposite a rotational direction of the fan 42 between the fan blade containment section 78 and the FEGV attachment section 82. The multiple of cascade airfoils 94 are arranged circumferentially about axis A axially forward of the FEGVs 68 to direct bypass flow in a forwardly direction to provide thrust reverse flow. The multiple of cascade airfoils 94 may be integral with or supported by the plurality of helical ribs 92.

The thrust reverser section 80 is readily located within the fan nacelle 66 aerodynamic lines to provide a relatively short system compared to that of conventional thrust reverser as well as a 360 degree discharge area. Relatively shorter length and smaller diameter nacelles improve fuel burn performance of aircraft engines through, for example, reduced drag, reduced duct pressure loss and reduced nacelle weight. The forward position of the thrust reverser section 80 also facilitates location of the engine 20 farther aft on an aircraft wing closer to wing leading edge and aircraft center of gravity.

The thrust reverser section 80 is located radially outward of a multiple of inner thrust reverser doors 96, radially inward of a multiple of outer thrust reverser doors 98 and axially forward of multiple of fan blocker doors 100 which selectively extend from the FEGVs 68 to selectively form a thrust reverse flow path through the fan nacelle 66. The geared turbofan architecture, in particular, facilitates the increased volume forward of the FEGVs 68 within the fan case 72 to locate the thrust reverser system disclosed herein, however, other engine architectures will benefit as well.

Each of the multiple of inner thrust reverser doors 96 may be mounted to one of the plurality of helical ribs 92 to define an inner hinge axis IH such that each of multiple of inner thrust reverser doors 96 open inwards toward the engine axis A. That is, the multiple of inner thrust reverser doors 96 may be somewhat transverse to the fan bypass flow path. The multiple of inner thrust reverser doors 96 are actively deployed and retracted through an actuator system 102 (illustrated schematically). As the multiple of inner thrust reverser doors 96 may be pivotally mounted directly to the fan case 72 and are thereby provided with structural support, it should be understood that various actuator systems may be utilized.

Each of the multiple of outer thrust reverser doors 98 may be mounted to the fan nacelle 66 to define an outer hinge axis OH generally parallel to the engine axis A such that each of multiple of outer thrust reverser doors 98 open outward relative the engine axis A. Although mounted to the fan nacelle 66 in the disclosed non-limiting embodiment, the multiple of outer thrust reverser doors 98 may alternatively or additionally be hingeally mounted directly to the fan case 72 to provide further structural support.

The multiple of outer thrust reverser doors 98 may be passively deployed due to the direction of the thrust reverse flow therethrough and utilize only a bias system 104 (illustrated schematically) to maintain the multiple of outer thrust reverser doors 98 in a closed position when no thrust reverse flow is selected. Alternatively, the multiple of outer thrust reverser doors 98 may be actively deployed and retracted independently of, or in conjunction with, the multiple of inner thrust reverser doors 96 such that the actuator system 102 may be a common actuator system.

Figure 4:
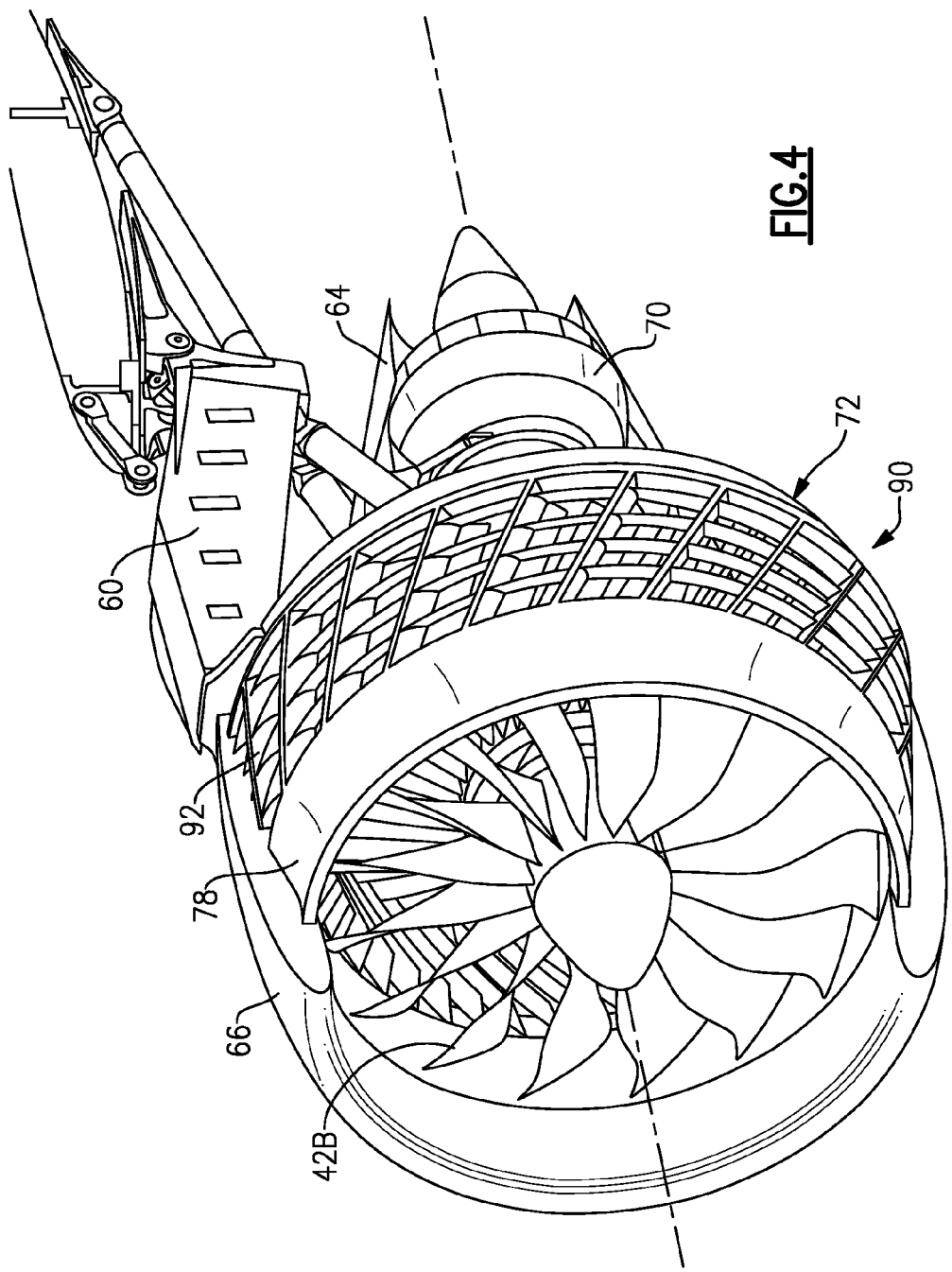
FIG. 4 is a perspective cross-sectional view of the gas turbine engine within a nacelle assembly illustrating a fan case with helical ribs.
Figure 5:
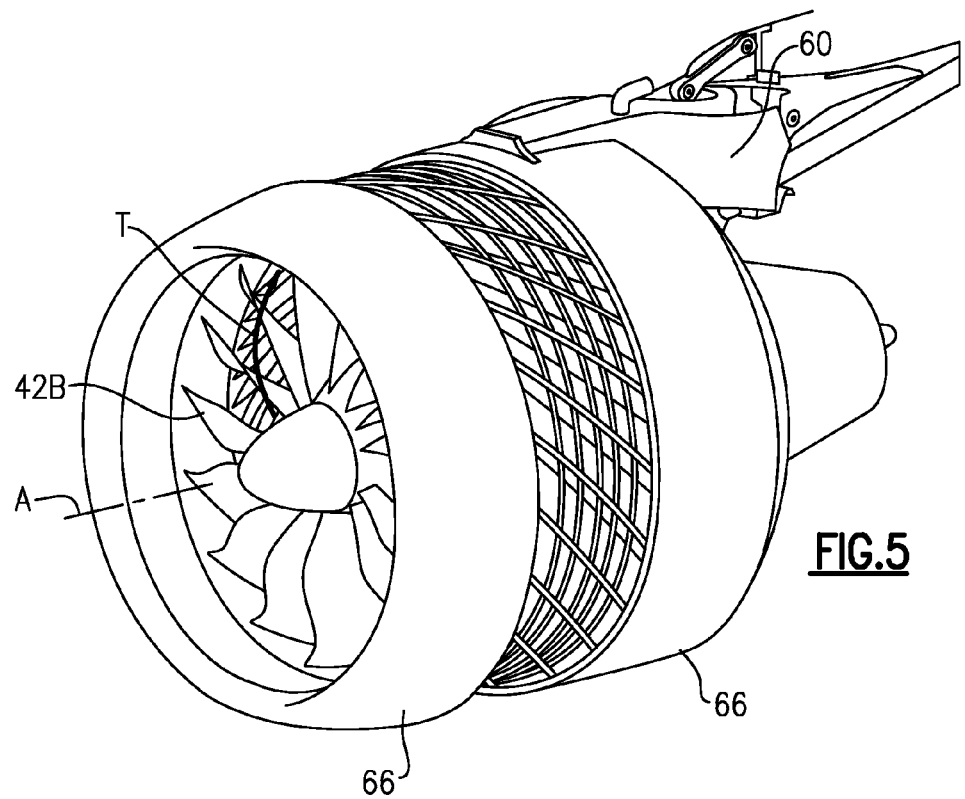
FIG. 5 is a perspective partial sectional view of the thrust reverser in a thrust reverse position.
Figure 6:
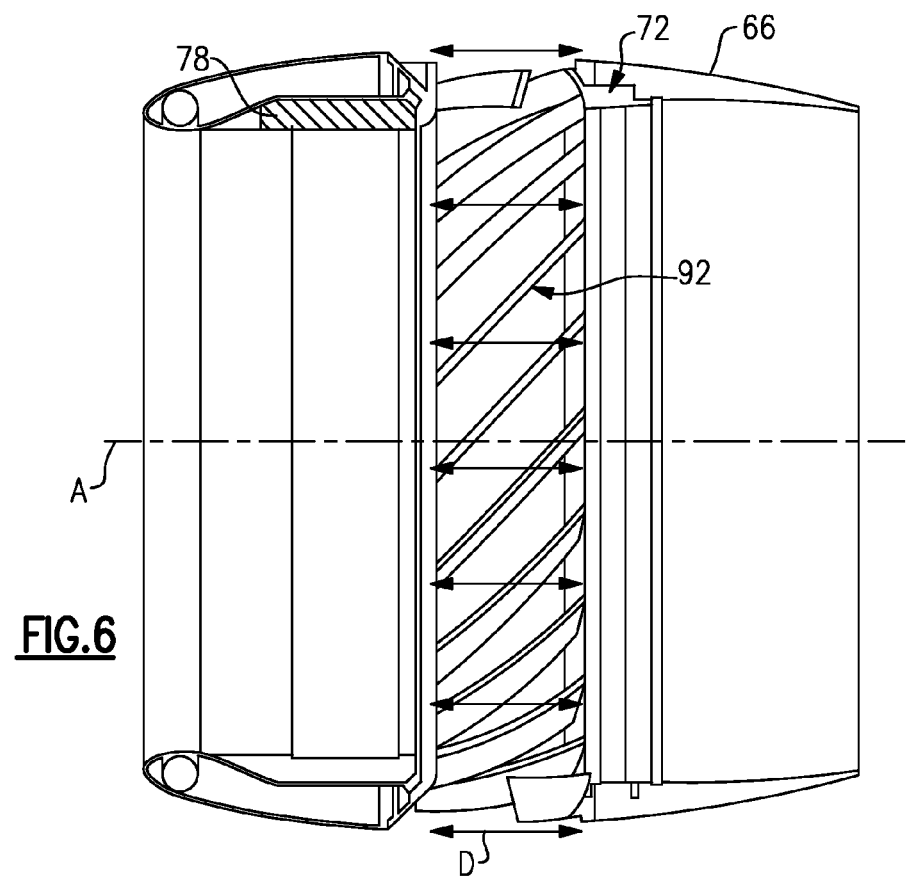
FIG. 6 is an enlarged cross-sectional view of the fan case illustrating axial energy absorption.

With reference to FIG. 4, the plurality of helical ribs 92 are immediately aft of the fan blade containment section 78. Should a fan blade 42B be liberated, the fan blade will strike the fan blade containment section 78 of the fan case 72 with substantial tangential force T (illustrated schematically; FIG. 4). The plurality of helical ribs 92 generates an advantageous stress-absorbing behavior within the fan case 72 due to the applied tangential force T. That is, dependent on the direction of travel of the fan blade 42B and debris (with or against the helical direction of the helical ribs 92) the fan case 72 will axially deflect in extension or compression along the engine axis A (schematically illustrated by arrows D; FIG. 6) and thereby absorb a portion of the impact energy. By such advantageous axial absorption of impact energy, the overall engine case structure may be lighter in weight yet still withstand the ultimate loads due to liberated fan blades.

The engine fan case 72 also typically transmits a large amount of energy to the attached engine mount structures such as the engine pylon structure 60. The engine pylon structure 60 is designed to particularly accommodate axial thrust loads along axis A. Axial redirection of the absorbed impact energy further facilitates a relatively lighter mount structure and require less overall material to absorb liberated fan blade energy as the impact loads due are redirected to the more readily accommodated axial direction.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A fan case of a gas turbine engine comprising:
   a fan blade containment section defined about an engine axis; and
   a plurality of helical ribs adjacent to said fan blade containment section, said helical ribs being axially deflectable responsive to a fan blade impact event on said fan blade containment section, wherein immediately circumferentially adjacent ones of said helical ribs have respective axially forward ends that are circumferentially spaced-apart and respective axially aft ends that are circumferentially spaced-apart, with a plurality of cascade airfoils that extend from one of said adjacent helical ribs to the other of said adjacent helical ribs.

2. The fan case as recited in claim 1, wherein said plurality of helical ribs are within a thrust reverser section.

3. The fan case as recited in claim 1, further comprising a fan guide exit vane section downstream of said plurality of helical ribs.

4. The fan case as recited in claim 1, further comprising a fan nacelle mounted to said fan case, said fan nacelle at least partially defined by a multiple of outer thrust reverser doors.

5. A gas turbine engine comprising:
   a fan case defined about an engine axis;
   a core case defined about said engine axis;
   a multiple of fan exit guide vanes supporting said fan case relative to said core case;
   a fan blade containment section within said fan case; and
   a plurality of helical ribs adjacent to said fan blade containment section, said helical ribs being axially deflectable responsive to a fan blade impact event on said fan blade containment section, wherein immediately circumferentially adjacent ones of said helical ribs have respective axially forward ends that are circumferentially spaced-apart and respective axially aft ends that are circumferentially spaced-apart, with a plurality of cascade airfoils that extend from one of said adjacent helical ribs to the other of said adjacent helical ribs.

6. The gas turbine engine as recited in claim 5, wherein said plurality of helical ribs are within a thrust reverser section.

7. The gas turbine engine as recited in claim 5, further comprising a fan nacelle mounted to said fan case.

8. The gas turbine engine as recited in claim 5, further comprising a fan mounted within said fan case, said fan axially in line with said fan blade containment section.

9. The gas turbine engine as recited in claim 8, wherein said fan is driven through a geared architecture.

10. A method of absorbing energy in a fan case of gas turbine engine during a fan blade impact event comprising:
    axially deflecting a plurality of helical ribs adjacent to a fan blade containment section in the fan case in response to the fan blade impact event on the fan blade containment section, wherein immediately circumferentially adjacent ones of said helical ribs have respective axially forward ends that are circumferentially spaced-apart and respective axially aft ends that are circumferentially spaced-apart, with a plurality of cascade airfoils that extend from one of said adjacent helical ribs to the other of said adjacent helical ribs.

11. The method as recited in claim 10, further comprising axially contracting the plurality of helical ribs.

12. The method as recited in claim 11, further comprising orienting the plurality of helical ribs in a direction of rotation of a fan.

13. The method as recited in claim 12, further comprising driving the fan through a geared architecture.

14. The method as recited in claim 11, further comprising directing thrust reverse flow through said plurality of helical ribs.

15. The method as recited in claim 10, further comprising orienting the plurality of helical ribs in a direction opposite a direction of rotation of a fan.

16. The method as recited in claim 15, further comprising driving the fan through a geared architecture.

17. The fan case as recited in claim 1, wherein said helical ribs have a distinct helical direction.

18. The fan case as recited in claim 1, wherein said helical ribs are axially deflectable in extension and compression dependent upon a direction of applied tangential force of said blade impact event.

19. The fan case as recited in claim 1, wherein said helical ribs have a helical direction such that said helical ribs are axially deflectable in extension and compression dependent upon a direction of applied tangential force of said blade impact event.

20. The method as recited in claim 10, including axially deflecting the helical ribs in either extension or compression dependent upon a direction of applied tangential force of the fan blade impact event.

* * * * *